No. 686,054. Patented Nov. 5, 1901.
H. E. GRABAU.
MACHINE FOR MAKING TUCKED CIGARETTES.
(Application filed Nov. 17, 1900.)
(No Model.) 9 Sheets—Sheet 4.

Witnesses
Inventor
Attorneys

No. 686,054. Patented Nov. 5, 1901.
H. E. GRABAU.
MACHINE FOR MAKING TUCKED CIGARETTES.
(Application filed Nov. 17, 1900.)
(No Model.) 9 Sheets—Sheet 6.

Fig. 6.

No. 686,054. Patented Nov. 5, 1901.
H. E. GRABAU.
MACHINE FOR MAKING TUCKED CIGARETTES.
(Application filed Nov. 17, 1900.)

(No Model.) 9 Sheets—Sheet 9.

Witnesses
Inventor
H. E. Grabau
by
Attorneys

THE NORRIS PETERS CO., PHOTO-LITHO., WASHINGTON, D. C.

UNITED STATES PATENT OFFICE.

HANS EDGAR GRABAU, OF HOBOKEN, NEW JERSEY, ASSIGNOR TO LOPEZ TRADING COMPANY, OF NEW YORK, N. Y., A CORPORATION OF NEW YORK.

MACHINE FOR MAKING TUCKED CIGARETTES.

SPECIFICATION forming part of Letters Patent No. 686,054, dated November 5, 1901.

Application filed November 17, 1900. Serial No. 36,918. (No model.)

*To all whom it may concern:*

Be it known that I, HANS EDGAR GRABAU, a subject of the Emperor of Germany, residing at Hoboken, Hudson county, State of New Jersey, have invented certain new and useful Improvements in Machines for Making Tucked Cigarettes, of which the following is a specification.

My invention relates to the manufacture of tucked cigarettes; and it consists of certain means whereby to compress the fillers, feed the wrappers thereto, and mold and wrap the fillers and tuck the tubular wrappers, as fully set forth hereinafter and as illustrated in the accompanying drawings, in which—

*The product.*—The product of the improved machine is a cigarette containing a mass of compressed tobacco forming the filler with a sheet of paper folded around and inclosing the same and tucked in at the ends in such manner as to maintain the wrapper in its closed position, constituting an imitation of a hand-wrapped cigarette.

*The main operations of the machine.*—The machine is constructed so as to, first, compress and form a mass of tobacco into a filler; secondly, to place the filler in a wrapper-sheet and convey the sheet and filler to and mold the filler in a mold; thirdly, to fold in first one side and then the other of the wrapper about the filler, and, fourthly, to tuck in the ends of the wrapper.

Figure 4:
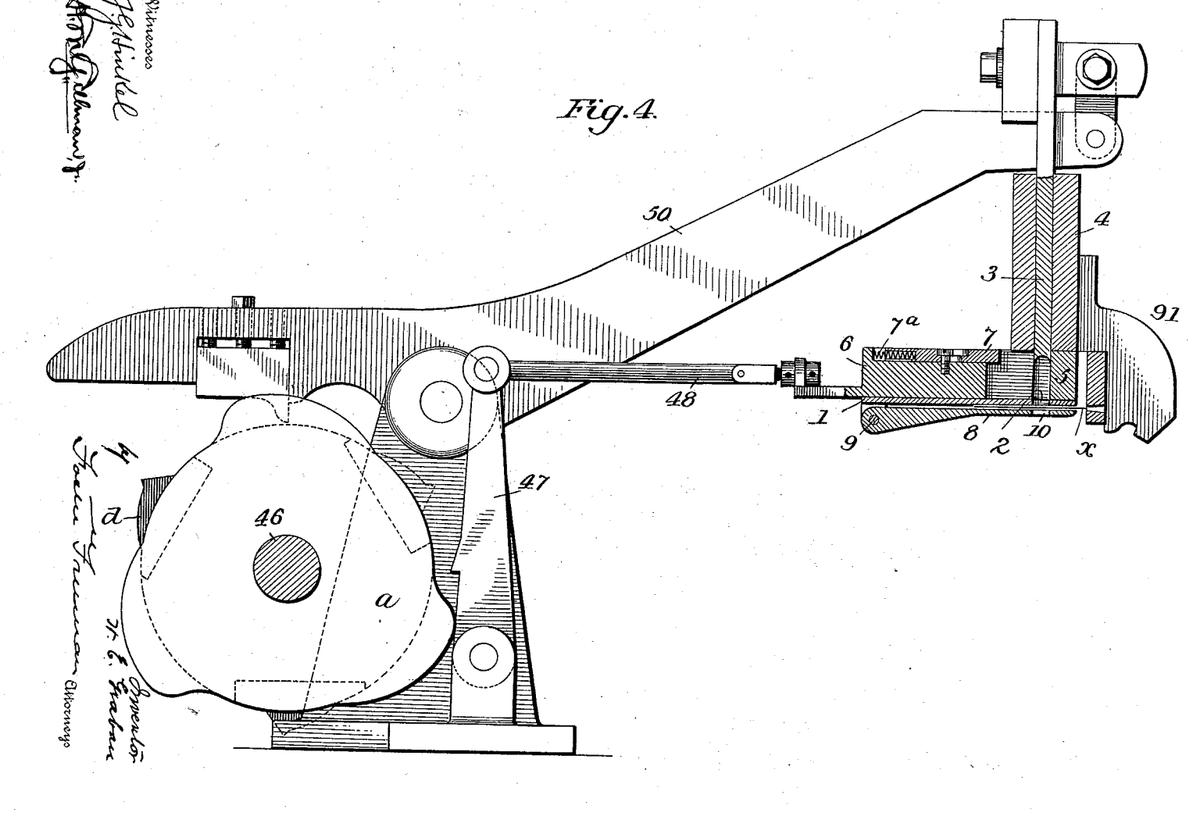
Fig. 4, a sectional elevation of the filler-forming devices and adjuncts.
Figure 5:
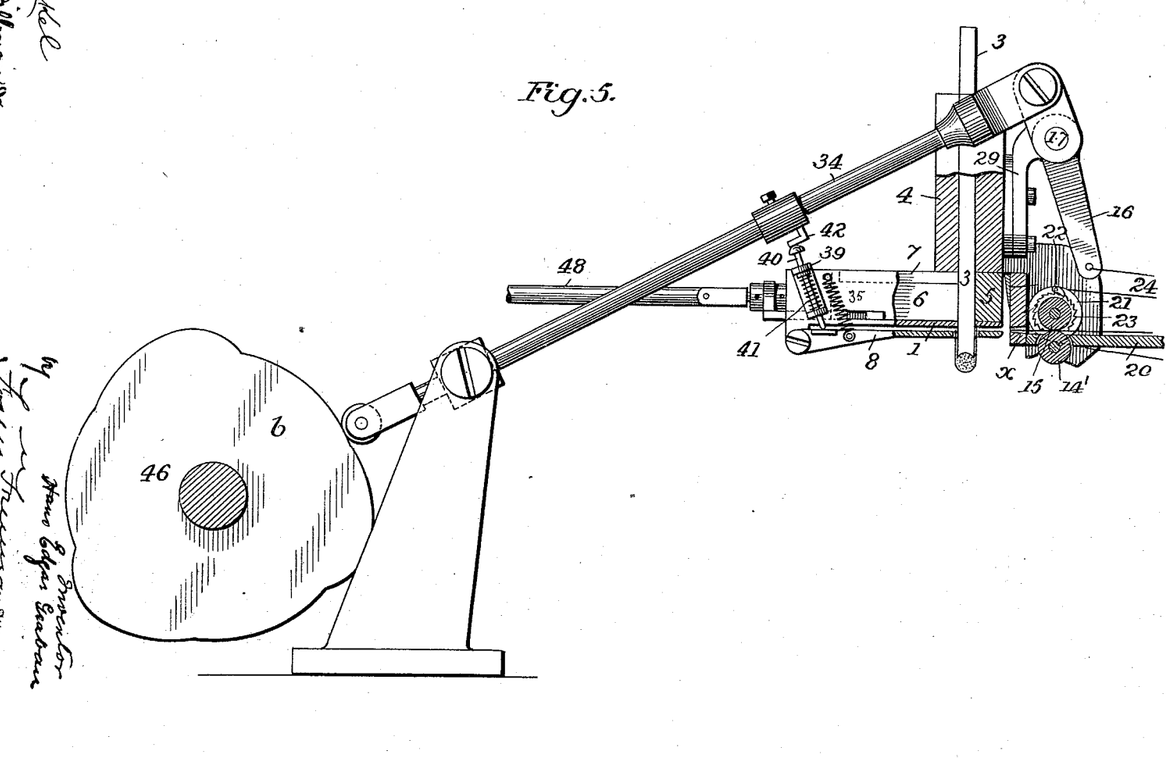
Fig. 5, a sectional elevation of the filler and paper feed devices and adjuncts.
Figure 8:
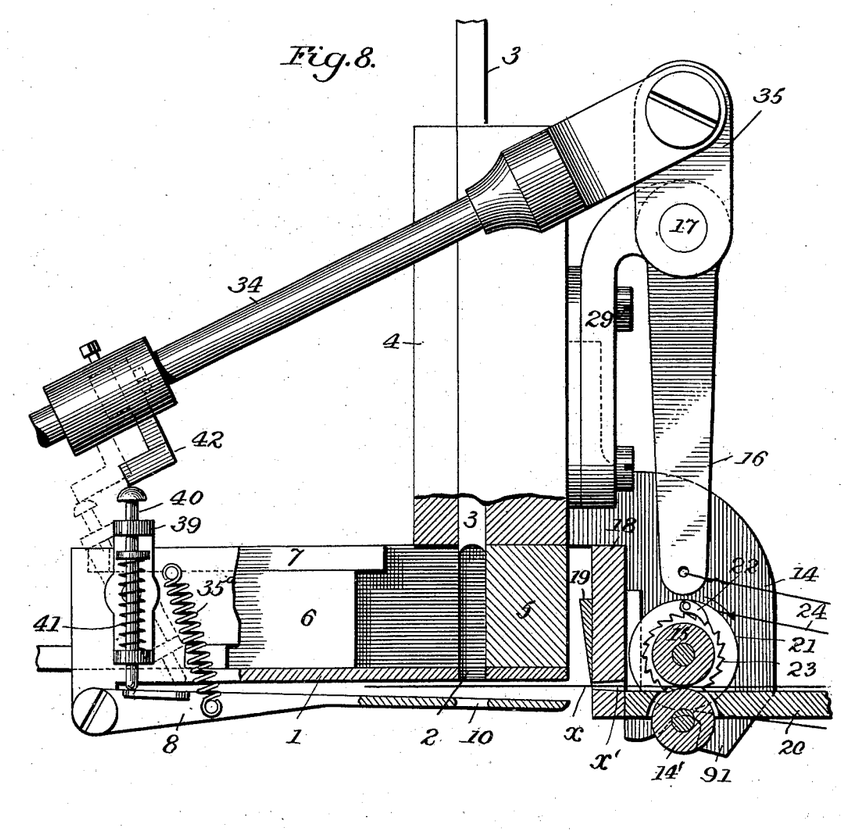
Fig. 8, an enlarged sectional elevation showing the paper-feed devices.

*The filler-forming mechanism.*—As best shown in Figs. 4, 5, and 8, the filler-forming mechanism comprises a table 1, having a slot 2, through which may pass a vertically-reciprocating plunger 3, grooved at the lower end and sliding in a cross-head 4 and back of a compressing-plate 5, the lower edge of which rests on the table 1. Upon the table 1 reciprocates a compressor 6 in the form of a sliding block, and upon the top of the latter slides to a limited extent a plate 7, which is thrown forward with its end projecting beyond the compressor 6 by means of a spring $7^a$, as shown in Fig. 4. When the compressor 6 is drawn fully back, a sufficient quantity of tobacco to form the filler is placed by any suitable automatic mechanism upon the table 1, and when the compressor 6 moves toward the compressing-plate 5 the tobacco is carried toward the latter and is compressed to the thickness of the plunger 3 and immediately below the latter, the projecting plate 7 preventing the fibers of the tobacco from rising above the compressor, the said plate 7 sliding back as it makes contact with the plunger 3, so that the tobacco will be compressed between the compressor 6 and the compressing-plate 5 and above the opening 2, below which extends the sheet of wrapping-paper $x$. Below the table 1 a clamping-blade 8 is pivoted at the inner end to a cross-bar 9, the said blade having a slot 10 corresponding to the slot 2, so that when the blade 8 is in the position shown in Fig. 5 the descent of the plunger 3 will carry the compressed mass of tobacco against the sheet $x$, folding the latter as it descends through the slot 10 into the mold below, where the tobacco is further compressed and molded by the descent of the plunger, after which the latter rises and the compressor moves backward to its first position.

Figure 1:
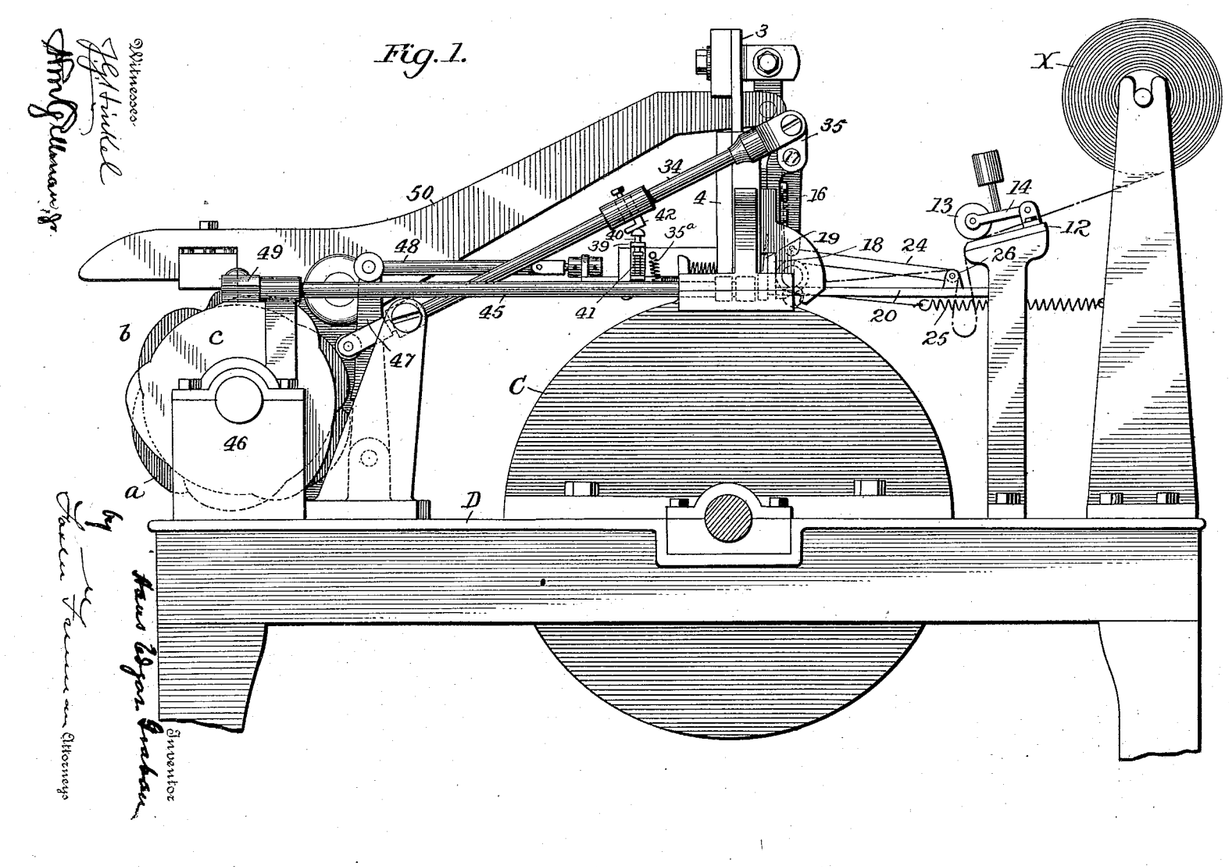
Figure 1 is a side elevation of a cigarette-wrapping machine, illustrating my improvement.
Figure 2:
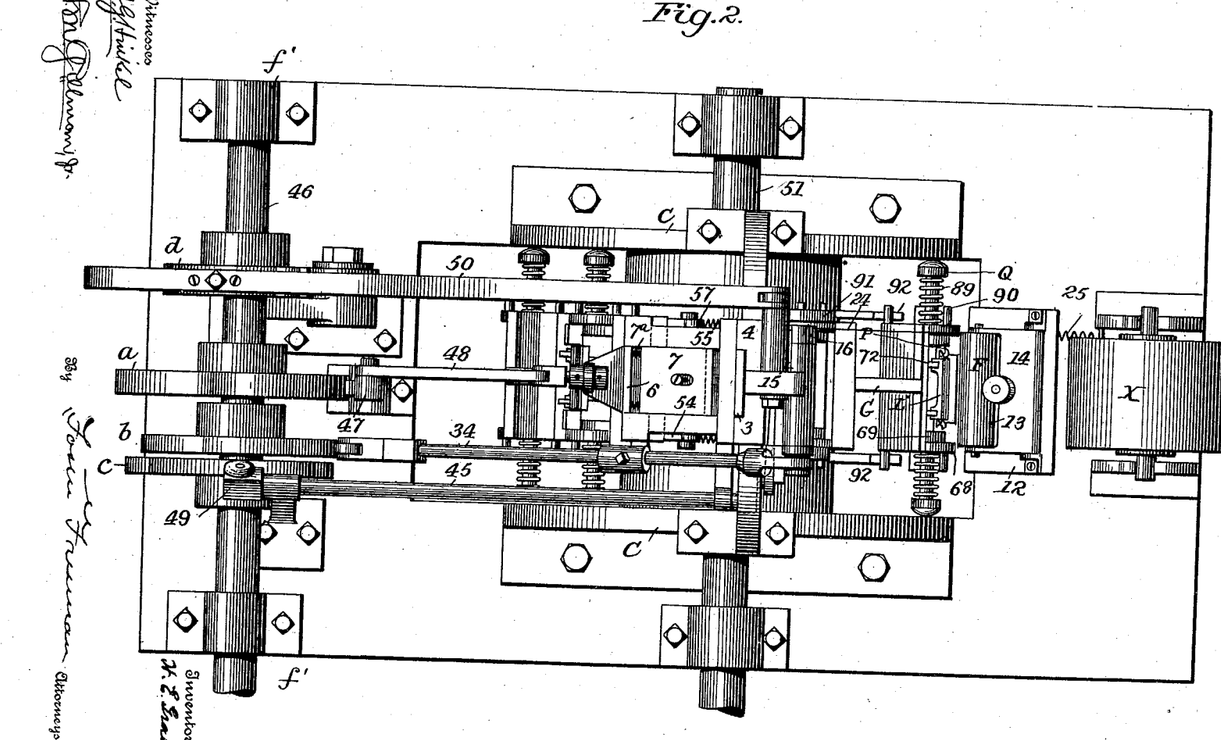
Fig. 2, a plan view.

*Paper-feeding devices.*—The strip of paper is carried from a suitably-supported roll X, Fig. 1, over an inclined plate 12, and a roller 13, turning in bearings of a weighted plate 14, pivoted above the plate 12, bears upon the paper, constituting a friction device, preventing the paper from delivering too freely. The paper is fed intermittently between the table 1 and the blade 8 by means of feed-rolls 14' 15 on opposite sides of a table 20, the roll 15 being a driving-roll and the roll 14' turning by friction therewith or with the paper strip x. Any suitable means may be employed for turning the roll 15. As shown, a pulley 21 turns freely on the roll-shaft and carries a spring-actuated pawl 22, which engages a ratchet-wheel 23, fixed to the roll-shaft. A cord 24 is secured at one end to a spring 25, passes around a guide-pulley 26, Fig. 1, and one or more times around the pulley 21, and is secured at the other end to the end of a vibrating arm 16, secured to a rock-shaft 17. When the arm 16 swings inward, it draws on the cord and turns the pulley and roll 15 and feeds the paper. When it swings outward, the cord is drawn on by the spring 25 and turns the pulley, but the pawl slips over the ratchet and does not turn the roll. The shaft 17 is rocked by a reciprocating rod 34, connected to an arm 35 on the rock-shaft, and the reciprocation of the said rod is also made the means of swinging the arm 16. A pivoted frame 39 carries a rod 40, having a collar bearing on a spring 41, which tends to lift the rod, the lower end of which when the rod is depressed bears upon the blade 8. The rod 34 carries an adjustable contact-piece 42, which as the rod moves toward and at its upper end in a curved path partly around the shaft 17 strikes the head of the rod 40, forcing it down to depress the blade 8 during the short interval that the contact-piece moves over the end of the rod 40, the latter rising as soon as the contact-piece passes away from it. On the return movement of the rod 34 the free end of the contact-piece 42 engages the side of the rod 40, tilting the frame 39 to the position shown in dotted lines, Fig. 8, so that no movement is then imparted to the blade 8, and it remains in its normally-raised position.

Figure 3:
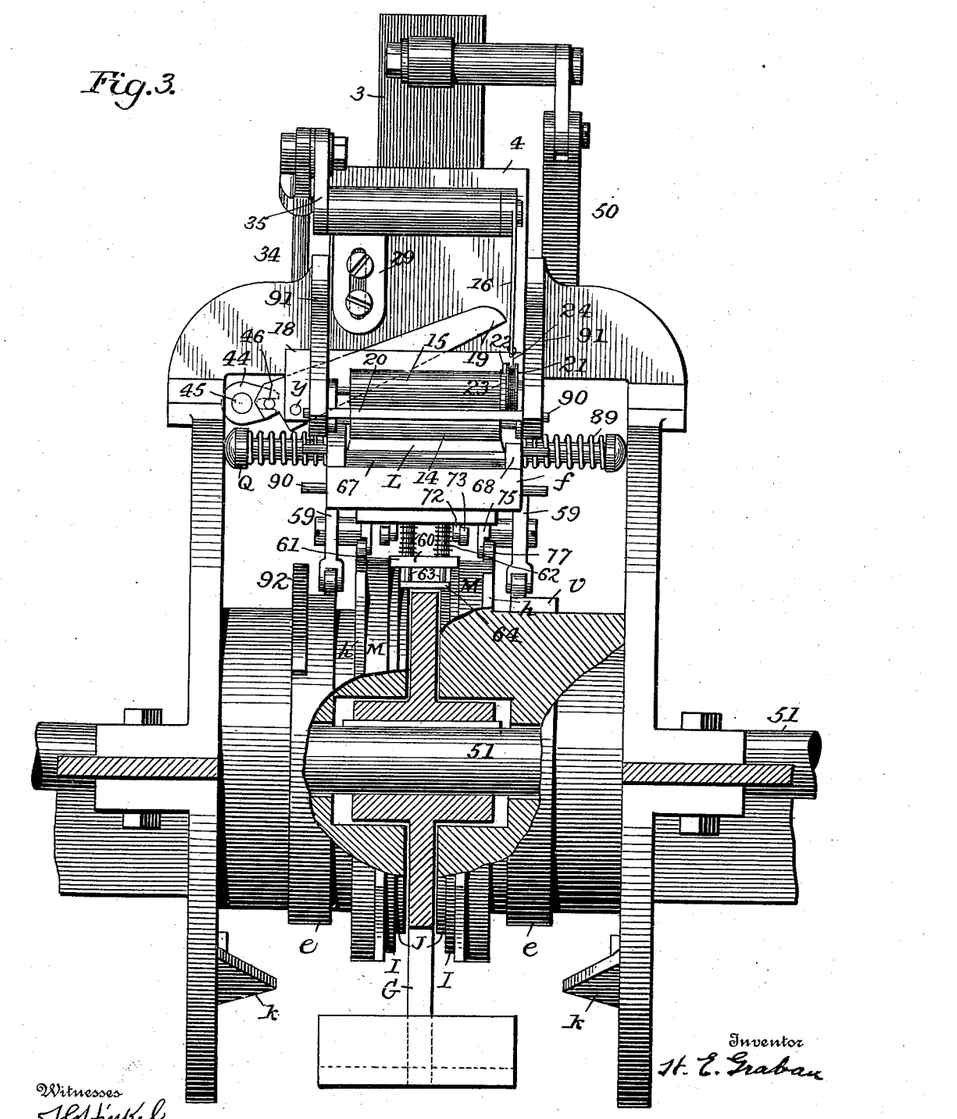
Fig. 3, a front elevation in part section.

*The cutter.*—The cutter is in the form of a knife 19, pivoted at y, Fig. 3, to the cross-bar 18 and shearing the paper across the opening x' in said bar. The knife is vibrated by an arm 44 upon a rock-shaft 45, which arm has a slot receiving a pin 46, extending from the heel of the knife-blade.

All of the above-named parts may be suitably mounted upon and operated from any moving parts of the machine. As shown, they are mounted upon the cross-head 4, supported by two cheek-pieces C C, bolted to the sides of a top frame D, in bearings f' f' of which turns a cam-shaft 46, carrying cams a b c d. The cam a acts upon a pivoted arm 47, connected by a rod 48 with the compressor-block 6. The cam b acts upon a roller at the end of the rod 34. The cam c acts upon the end of an arm 49, extending from the rock-shaft 45. The cam d operates upon the heel of a lever 50, which is connected with a link attached to an arm projecting from the plunger 3.

All of the above-named parts are provided with springs (not shown) so arranged as to keep them in contact with their cams or to secure the return movement after the parts have been operated upon in one direction by the cams.

*The molds.*—The molds F may be formed in any suitable manner, may be of any suitable number, and may be reciprocated back and forth from below the opening 10 by means of any desired devices.

As shown, the molds are carried by a continuously-rotating head G on a shaft 51, turning in the frame D, and are so movably supported thereon that each mold as it comes to position below the opening 10 may be arrested during the time the wrapper and filler are being carried through said opening to the mold and will thereafter continue to rotate with the head G, the rotation of which is regular and uninterrupted.

While the molds may be mounted in different ways upon the head to secure this result, I prefer to provide the head with recesses w for receiving the frames of the molds with transverse guide-bars 50, (preferably curved upon circles of which the axis of the shaft 51 carrying the head is the center,) the recesses w being of such width as to permit the desired relative movements of the head and molds.

Figure 6:
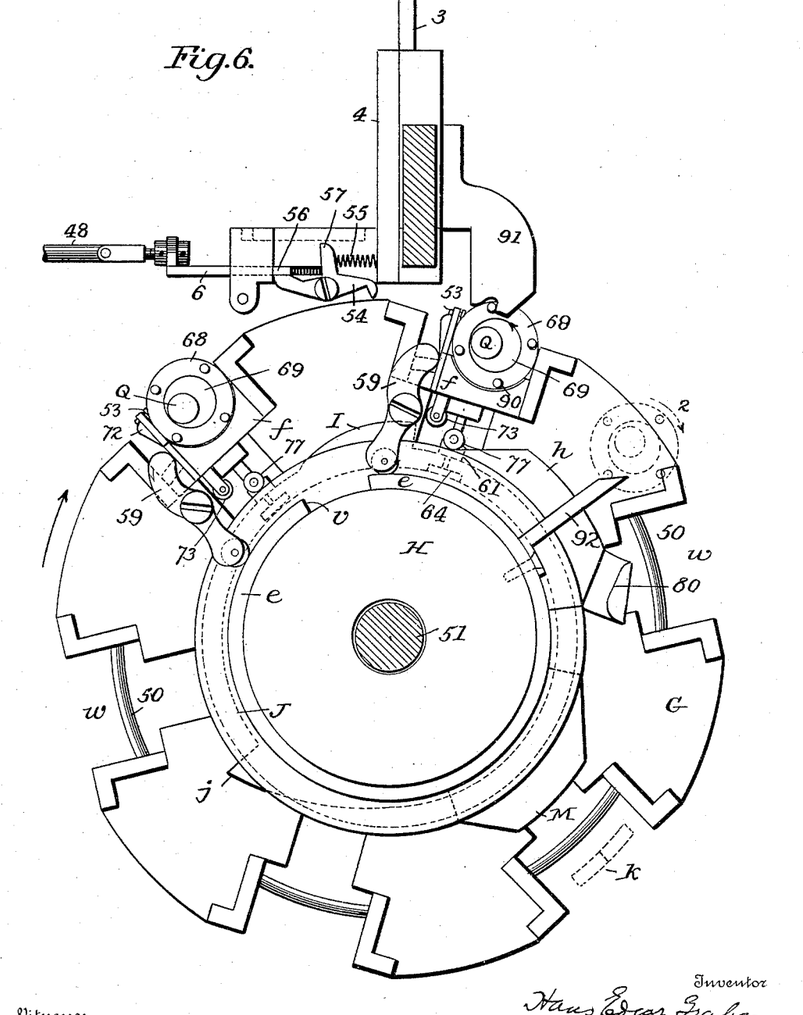
Fig. 6, a side view in part section, showing the revolving head, molds, and devices for operating the molds and mold-frames.
Figures 7, 9:
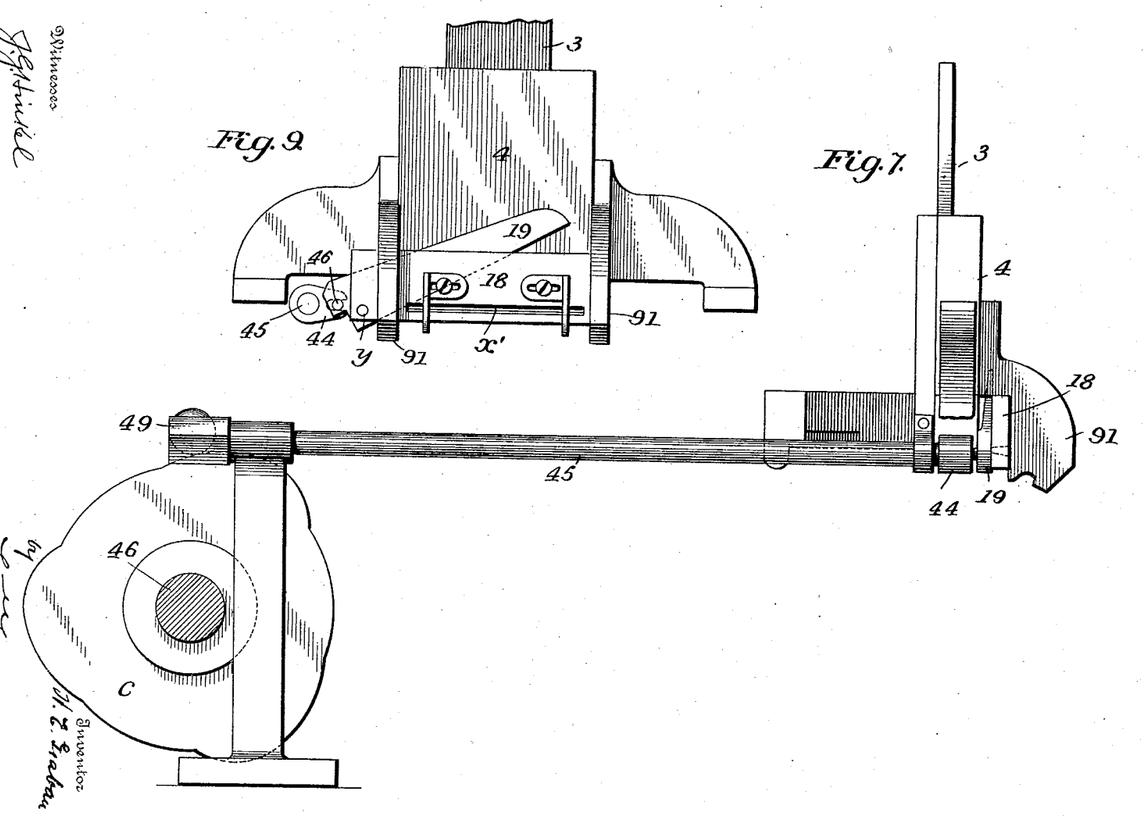
Fig. 7, a detached view of devices connected with the cutter.
Fig. 9, a front view showing the cross-head and arrangement of cutter thereon.
Figure 11:
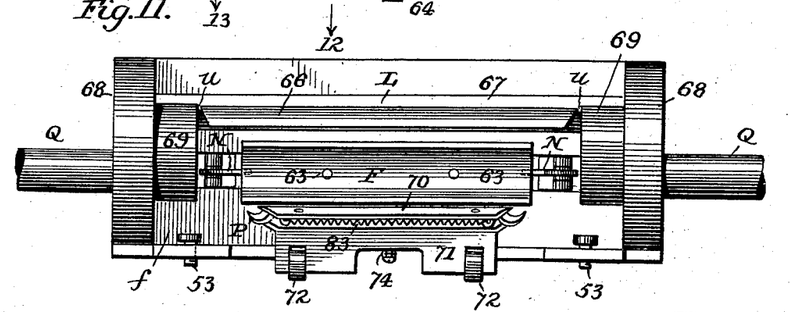
Fig. 11 is a plan of Fig. 10.

The frame f of each mold is provided with adjustable contact-screws 53, Fig. 11, with the heads of which engage the hooked ends of dogs 54, pivoted to the side pieces of the cross-piece 4 and normally held out of position to engage the contact-pieces 53 by springs 55. The rear arms of the dogs 54 make contact with lugs 56 at the sides of the compressor 6, and the dogs have arms 57, which are struck by the lugs 56 as the compressor takes its forward position, compressing the filler, the hooked ends of the dogs being thus depressed, so as to engage the contact-pins 53 and arrest the movement of each mold-frame as the mold is brought below the plunger 3. While the head G continues its rotation, the plunger descends and deposits the paper and filler in the mold, molds the filler, and rises, by which time the mold will have been brought in contact with the rear face of the opening w and the dogs will have been lifted, when the mold will continue its movement with the head G. Any suitable means may be employed for thereafter carrying the molds to the opposite side of the recess w. As shown, arms 59 are pivoted to the sides of the head G, so as to bear upon each mold and also upon a rib e upon the periphery of a cam H, secured to the frame of the machine, the said rib being cut away at the point v, Fig. 6, so that the lever 59 will be out of contact with the rib and can swing freely when the movement of the mold-frame is arrested.

Figure 10:
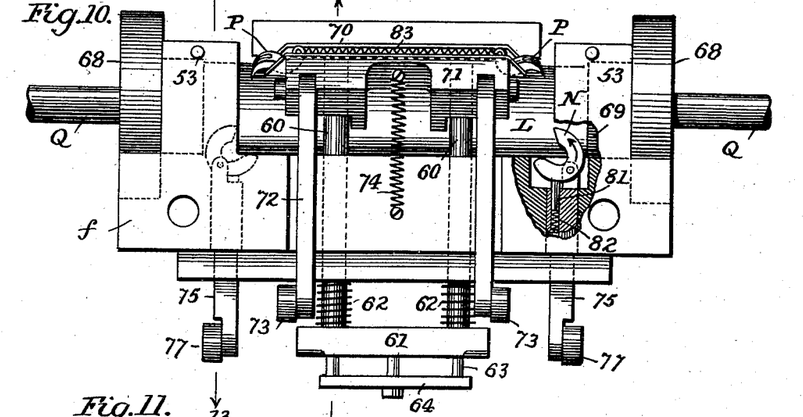
Fig. 10 is a side elevation in part section of one of the mold-frames and connected parts.
Figures 12, 14, 15:
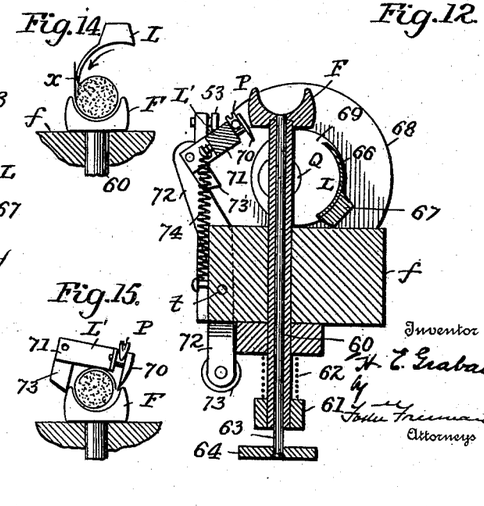
Fig. 12, a section on the line 12 12, Fig. 10.
Figs. 14 and 15, views showing the mold and folders in different positions from those shown in Figs. 10 and 11.

Each mold F consists of a strip having a longitudinal semicircular groove and supported by guide-tubes 60, sliding radially in the mold-frame f and connected at the lower ends by a cross-piece 61, Figs. 10 to 12, springs 62 tending to depress or move inward the cross-piece to bring the mold down upon the frame f.

Figure 13:
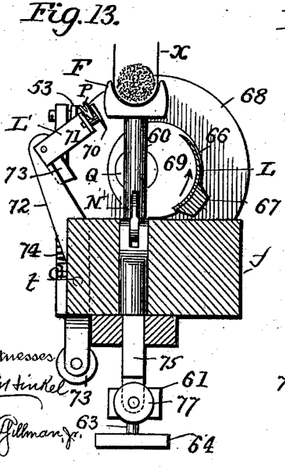
Fig. 13, a section on the line 13 13, Fig. 10.

As each mold is brought toward the position in which it is to receive the wrapper and filler it is elevated below the slot 10 and held in its elevated position, Figs. 12 and 13, so long as the wrapper and filler are being introduced and the filler compressed. Any suitable means may be employed to elevate and carry inward the molds. As shown, stationary cams I I, Fig. 3, concentric with the shaft 51, have cam edges, which engage the under face of the cross-bar 61 and lift the latter as the mold approaches the position in which it is to receive the wrapper and filler and immediately thereafter permit it to descend.

When the wrapper has been folded around the filler and the ends tucked in, the cigarette is discharged from the mold. This is effected through the medium of pusher-rods 63, extending through the tubes 60 and connected to a cross-bar 64, which is pushed outward by means of cams J, connected with the disk supporting the cams I and having projections j, Fig. 6, at the point where the cigarette is to be discharged.

*The folders.*—There are two folders L L', which act successively to turn in first one side edge and then the other of the wrapper. The folder L is provided with a thin curved blade 66, carried by a cross-bar 67, secured to two rings 68 68, turning upon two fixed disks 69 of the mold-frame f, shoulders u, Fig. 11, of the bar 67, engaging the inner faces of the disks 69, preventing longitudinal movement of the parts. After the mold F has descended to the position shown in Fig. 14, the axis of the mold being at one side of or eccentric to that of the disk 69, the movement of the folder L in the direction of its arrow, Figs. 13 and 14, will carry it against one side of the wrapper x and will turn the latter inward and over the filler and tuck its side edge between the filler and the opposite side of the wrapper, as shown in Fig. 14, after which the folder L returns to the position shown in Fig. 13. The folder L' is provided with a blade 70, carried by pins projecting from a frame 71, pivoted to two arms 72, each of which is pivoted at t, Figs. 12 and 13, to the frame f and carries at its lower end a roller 73. The frame 71 has downwardly-projecting lugs 73 and is connected with a spring 74, attached at the other end to the frame f and which tends to maintain the parts in the position shown in Fig. 12. After the folder L has moved back to the position shown in Fig. 13 the arms 72 swing inward, and as the lug 73 contacts with the side of the mold the inner end of the frame 71 is depressed and the blade 70 carries the standing side edge of the wrapper x inward, folds the latter down upon the opposite turned-in side edge of the wrapper, and holds it in the position shown in Fig. 15. The vibration of the arms 72, carrying the folder L', is effected by cams M M, which engage the rollers 73 on the ends of the arms 72, and as soon as the projections of these cams pass from the rollers the parts are restored to the position shown in Fig. 12 by the spring 74.

*The tuckers.*—There are two pairs of tuckers, one of which, the tuckers N N, operate after one side edge of the paper is folded in, as shown in Fig. 14, while the others, P P, operate after both side edges have been folded in, as shown in Fig. 15. Each tucker N is a U-shaped piece, Fig. 10, pivoted to the upper end of a rod 75, sliding in a frame f, and when the rod 75 is lifted one arm of the U-shaped tucker strikes the bottom of the mold F, so that the other arm is caused to swing inward in the direction of the arrow, Fig. 10, and tuck in the end of the wrapper. The ends of the rods 75 carry rollers 77, which ride upon projections h of the disk supporting the cams M and which move the rods 75 outward and cause the tucking by the tuckers N. The bars 75 are carried inward by means of cams 80, with which the rollers 77 engage. Each tucker N is normally held in the position shown in Fig. 10 by a sliding pin 81 in a recess in the rod 75, within which is also confined a spring 82, which tends to move the pin outward to bear against one arm of the tucker. The second pair of tuckers P P consist of L-shaped pieces pivoted back of the blade 70, the inner arms connected by a spring 83, which tends to hold them in the position shown in Fig. 10. As the mold is brought toward the position in which the tuckers P are to operate the latter are forced inward by sliding rods Q Q, each of which extends through one of the disks 69 and which as it moves inward makes contact with the outer arm of the opposite tucker P and forces the said arm in against the paper to make the second tuck. The rods Q are forced inward by stationary cams k on the frame of the machine, Fig. 3, and are forced outward by springs 89, bearing upon the heads of the rods. The rings 68 are turned to carry the folder back and forth by means of arms, which make contact with pins 90, extending laterally from the rings. One pair of arms 91 is suspended from the cross-piece 4, Fig. 6, in such position that shoulders thereon will be struck by the uppermost of the pins 90, the rings 68 being thus turned in the direction of the arrow, Fig. 6, to carry the folder L to the position shown in Fig. 14. Another pair of arms 92, projecting from the cheeks C C, is arranged in the position shown in Fig. 6 and as the head revolves turns the rings in the direction of the arrow 2 in the said figure to carry the folder L back to the position shown in Fig. 13.

I do not limit myself to the precise shape and arrangement and proportions of the parts above described, nor to the precise means set forth for imparting motion to the main operating features of the machine, as it will be evident that these may be varied without departing from the main features of my invention.

I claim—

1. The combination of a table, a reciprocating plunger, a compressing-plate, a reciprocating compressor-block, and a slide yieldingly supported upon the top of the compressor-block, substantially as described.

2. The combination with the slotted table, of a compressing-plate, a reciprocating plunger, a reciprocating compressor-block, a blade arranged beneath the table, and means for swinging said blade to clamp and release the paper, substantially as set forth.

3. The combination of the slotted table, vibrating blade below the same, means for feeding paper intermittently between the blade and the table, and means for moving the blade to clamp and release the paper, substantially as set forth.

4. The combination of the slotted table, means for compressing and discharging the filler through said table, a clamping-blade beneath the table, and a cross-bar having a guiding-slot for directing the wrapper-strip between the table and the blade, substantially as described.

5. The combination of the slotted table, the plunger, the compressing devices, the clamping-blade 8, the spring 35, the reciprocating rod 34, the vibrating frame carrying the pin 40, the spring for lifting the latter, and the contact-piece on the rod 34 for engaging the pin 40, substantially as set forth.

6. The combination of the filler-compressing and wrapper-cutting devices, a paper-feeding device consisting of parallel rolls, a pulley, vibrating arm, cord and spring, a ratchet-wheel connected to one of the rolls, and a pawl carried by the pulley and engaging the ratchet-wheel, substantially as set forth.

7. The combination of the means for forming the fillers and feeding wrappers thereto, a head carrying a series of molds for receiving the wrappers and fillers, the said molds supported movably upon the head, means for continuously rotating the head, and means for arresting the molds successively as the wrappers and fillers are fed to the same, substantially as set forth.

8. The combination of the continuously-rotating head, a series of molds supported movably upon the said head, means for arresting the molds to receive wrappers and fillers, and means for moving the molds upon the head after the wrappers and fillers are fed thereto, substantially as set forth.

9. The combination of the head and means for rotating the same continuously, guides upon the head for supporting frames to which molds are attached, hooks upon the frame for engaging the frames of the molds, means for disengaging said hooks after the molds have received wrappers and fillers, levers carried by the head and bearing upon the mold-frames, and cams engaging said levers to vibrate the same to shift the mold-frames, substantially as set forth.

10. The combination of the recessed revolving head, guide-rods extending across the recesses, mold-frames sliding on the said guide-rods, and means for moving said frames in different directions, substantially as set forth.

11. The combination with the revolving head, of molds F, a slotted table, means for carrying fillers and wrappers toward the molds as they are brought beneath the table, and means for elevating each mold to receive the fillers and wrappers, substantially as set forth.

12. The combination in a cigarette-machine, of a mold F means for feeding a wrapper and filler thereto, means for elevating the mold to receive the wrapper and filler, folders, means for carrying them from opposite sides across the mold to fold in the opposite sides of the wrapper, and tuckers for tucking in the ends of the wrapper, substantially as set forth.

13. In a cigarette-machine, the combination with the filler-forming and the wrapper-feeding devices, of the folders, the tuckers, and the means for operating them alternately, whereby one side edge of the wrapper is first folded down, the ends then partly tucked, the second side edge folded down, and the ends thereafter completely tucked, substantially as set forth.

14. The combination with the mold F, of a folder L having a curved blade, means for carrying it across and into the mold, tuckers, and means for operating them after the operation of said folder-blade, a second folder-blade operating in a reverse direction, and tuckers, and means for operating them after the operation of the second folder, substantially as set forth.

15. The combination of the mold F, a frame supporting the same, a folder L, rings supporting said folder and turning around a center eccentric to the center of the mold, and means for turning said rings first in one direction and then the other, substantially as set forth.

16. The combination of the rotating head, series of molds carried thereby, a folder L, supporting-rings adjacent to each mold, pins projecting from said rings, and contact-pieces supported adjacent the head to make contact with said pins to rotate the rings first in one direction and then in the other, substantially as set forth.

17. The combination of the mold F, its supporting-frame, levers 72, a folder-blade, a frame pivoted to said levers and supporting said blade, and means for vibrating the levers and the frame, substantially as set forth.

18. The combination of the mold, levers 72, folder-blade, frame pivoted to the levers and provided with lugs 73, a spring for drawing back the said frame, and means for vibrating the levers to carry the frame over the mold and bring the lugs 73 in contact with the mold, substantially as set forth.

19. The combination of the mold F, folder-blade 70, frame supporting the latter, tuckers also carried by said frame, and means for operating said tuckers, substantially as set forth.

20. The combination of the rotating head, molds, folder-blade 70, tuckers carried therewith, tucker-operating bars Q also carried by said head, and means for pushing in and out the said bars to operate the tuckers, substantially as set forth.

21. The combination with the rotating head, of molds F, frames supporting the same, and rods sliding in said frame and carrying U-shaped tuckers N, substantially as set forth.

22. The combination of the mold, supporting-frame, rods 75 sliding in the frame, U-shaped tuckers pivoted to said rods, and means for holding the tuckers in position for their inner arms to make contact with the mold, substantially as set forth.

23. The combination of the mold F, a folder arranged at each side of the same, means for carrying the folders alternately in opposite directions across the mold, and two sets of tuckers arranged to operate successively, whereby one side edge of the wrapper is first folded down, the ends then partly tucked, the second side edge folded down, and the ends thereafter completely tucked, substantially as set forth.

24. The combination of the rotating head, a series of molds carried thereby, means for moving the molds outward to receive fillers and wrappers and for then carrying them inward, and folding and tucking devices, substantially as described.

25. The combination with the rotating head, of series of molds and frames carrying the latter, folding and tucking devices carried by the frames, parts connected with said devices and extending below the frames, and a series of stationary cams concentric with the head and arranged to operate upon said parts to impart the proper movements to the said devices, substantially as described.

26. The combination with the revolving head, of molds, tuckers P, operating-rods Q, and projections upon the frame arranged to contact with the ends of the said rods to move them inward, substantially as set forth.

In testimony whereof I have signed my name to this specification in the presence of two subscribing witnesses.

HANS EDGAR GRABAU.

Witnesses:
  A. E. T. HANSMANN,
  W. CLARENCE DUVALL.